United States Patent
Schmid

(12) 
(10) Patent No.: US 7,295,914 B2
(45) Date of Patent: Nov. 13, 2007

(54) INTERNAL COMBUSTION ENGINE WITH SPEED RECOVERY POWER BOOST

(75) Inventor: Karl Josef Schmid, Denver, IA (US)

(73) Assignee: Deere & Company, Moline, IL (US)

( * ) Notice: Subject to any disclaimer, the term of this patent is extended or adjusted under 35 U.S.C. 154(b) by 166 days.

(21) Appl. No.: 11/199,528

(22) Filed: Aug. 8, 2005

(65) Prior Publication Data

US 2007/0028892 A1 Feb. 8, 2007

(51) Int. Cl.
*G06F 19/00* (2006.01)
*F02D 31/00* (2006.01)
*F02D 21/04* (2006.01)

(52) U.S. Cl. ............... 701/104; 701/110; 701/115; 123/333

(58) Field of Classification Search ......... 123/332, 123/333, 349–352, 357, 364, 492; 701/54, 701/103–105, 110
See application file for complete search history.

(56) References Cited

U.S. PATENT DOCUMENTS

| 2,401,558 | A | * | 6/1946 | Edwards | 123/364 |
| 3,714,935 | A | * | 2/1973 | Dreisin | 123/364 |
| 6,950,735 | B2 | * | 9/2005 | Kilworth et al. | 701/54 |

FOREIGN PATENT DOCUMENTS

JP  59032630 A  *  2/1984  ............ 123/333

* cited by examiner

*Primary Examiner*—Willis R. Wolfe, Jr.

(57) ABSTRACT

A method of operating an internal combustion engine, includes the steps of: detecting an operating speed reduction of the internal combustion engine; determining if the operating speed reduction is caused by an external load; and controlling operation of a fuel supply system to increase an output of fuel above a normal maximum fuel output, when the operating speed reduction is caused by the external load.

21 Claims, 3 Drawing Sheets

INTERNAL COMBUSTION ENGINE WITH SPEED RECOVERY POWER BOOST

FIELD OF THE INVENTION

The present invention relates to internal combustion engines, and, more particularly, to power boost techniques for such engines.

BACKGROUND OF THE INVENTION

The step load response of an internal combustion (IC) engine in transient after a load impact is a feature mostly influenced by the engine displacement, the hardware of the engine (e.g., whether it has a standard turbocharger, a turbocharger with waste gate or variable geometry, etc.), and by the software strategy for driving the air and fuel actuators (e.g., exhaust gas recirculation, turbocharger with variable geometry turbine (VGT), fuel injector configuration, etc.) with respect to the requirements of emissions legislation (e.g., visible smoke, NOx, etc.), noise or vibrations.

Engine systems as a whole react in a linear manner during the application of a transient external load. Initially, the load is applied to the drive shaft of the IC engine. The IC engine speed decreases when the load increases. The engine speed drop is influenced by whether the governor is isochronous or has a speed drop. The air flow is increased to provide additional air to the IC engine by modifying the air actuators. A time delay is necessary to achieve the new air flow set point. The fuel injection quantity, which is nearly immediate, is increased with respect to both the smoke limit and maximum allowable fuel quantity. The engine then recovers to the engine speed set point. The parameters associated with an engine step load response in transient after a load impact are the speed drop and the time to recover to the engine set point.

With conventional IC engine systems, a fuel injection system under the control of an electronic control module (ECM) provides fuel to the combustion cylinders. The maximum mechanical torque output from the engine is a limiting factor on the normal maximum fuel level which is provided to the combustion cylinders. Under a high external transient load as described above, the fuel level remains limited to the normal maximum fuel level supplied to the combustion cylinders, and the engine speed drop and recovery time can be excessive.

What is needed in the art is a power boost method for an IC engine which improves engine speed drop and recovery time.

SUMMARY OF THE INVENTION

The present invention provides and internal combustion engine with a power boost which is dependent upon a sensed external load.

The invention comprises, in one form thereof, a method of operating an internal combustion engine, including the steps of: detecting an operating speed reduction of the internal combustion engine; determining if the operating speed reduction is caused by an external load; and controlling operation of a fuel supply system to increase an output of fuel above a normal maximum fuel output, when the operating speed reduction is caused by the external load.

The invention comprises, in another form thereof, a method of operating an internal combustion engine, including the steps of: sensing an operating speed of the internal combustion engine; detecting an operating speed reduction using the sensed operating speed; comparing a difference between a desired operating speed and the sensed operating speed with a boost on threshold value; determining if the operating speed reduction is caused by an external load; and controlling operation of a fuel supply system to increase an output of fuel above a normal maximum fuel output, dependent upon each of the comparing and determining steps.

An advantage of the present invention is that the IC engine experiences faster speed recovery when an external high inertia load is applied.

Another advantage is that the maximum fueling level can be temporarily increased above a normal maximum fueling level during a period of high external load, and then returned to normal torque curve fueling for normal operation.

Yet another advantage is that the IC engine has a more constant operating speed, resulting in better operator control of hydraulically driven loads.

A further advantage is that the tendency for IC engine stalling is reduced when engaging high inertia loads.

DESCRIPTION OF THE PREFERRED EMBODIMENT

Figure 1:
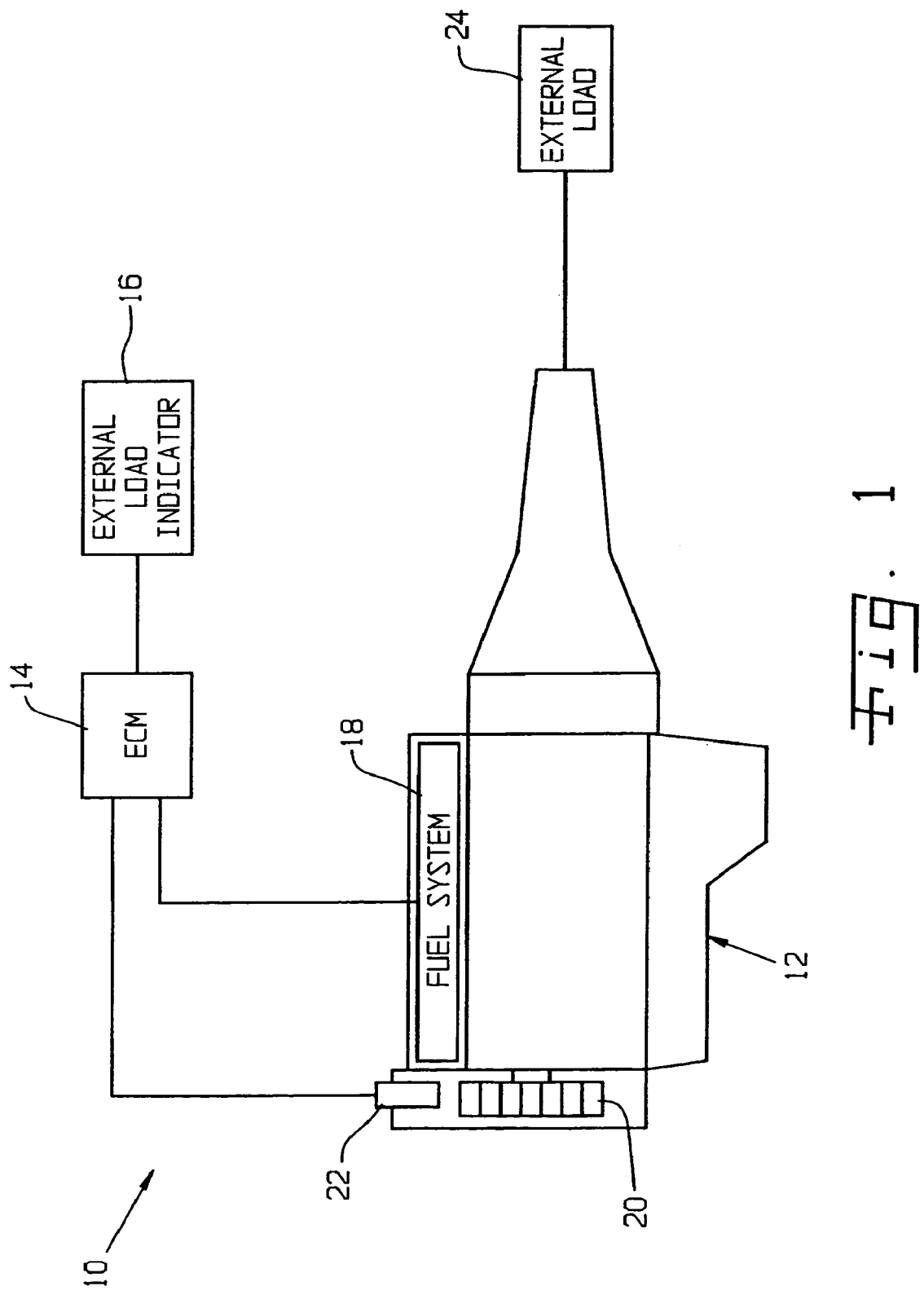
FIG. 1 is a schematic illustration of an embodiment of an IC engine of the present invention, which may be used with the method of operating an IC engine of the present invention.

Referring now to the drawings, and, more particularly to FIG. 1, there is shown an embodiment of an IC engine system 10 of the present invention, which may be used with the method of operating an IC engine of the present invention. IC engine system 10 generally includes an IC engine 12, an electrical processing circuit in the form of an ECM 14, an external load indicator 16, a fuel system 18, a flywheel 20, and a speed sensor 22.

IC engine system 10 may be incorporated into any suitable application, such as an off road vehicle (e.g., agricultural tractor or combine), on road vehicle (e.g., heavy truck), or stationary power set (e.g., electrical generator set).

IC engine 12 is also coupled with an external load 24. In the case that IC engine 12 is part of an agricultural combine, external load 24 may be, e.g., an engagement of a grain separating cylinder or unloading auger. In the case IC engine 12 is part of a stationary generator set, external load 24 may be in the form of an energized electrical load. In other exemplary applications, IC engine 12 and external load 24 may be part of a hydraulic excavator, a tree harvester, or other applications where a high energy inertial load is engaged.

IC engine system 10 may be incorporated into any suitable application, such as an off road vehicle (e.g., agricultural tractor or combine), on road vehicle (e.g., heavy truck), or stationary power set (e.g., electrical generator set).

ECM 14 is coupled with sensor 22, external load indicator 16 and fuel system 18. In the embodiment shown, ECM 14 receives input signals from sensor 22 and external load indicator 16, and provides output signals to fuel system 18. Further, ECM 14 is coupled via electrical wires with sensor 22, external load indicator 16 and fuel system 18, but could also be coupled via suitable wireless connections depending upon the application.

Although the electrical processing circuit associated with IC engine 12 is in the form of an ECM, it should be apparent to those skilled in the art that any suitable configuration of digital and/or analog circuitry may be used.

Fuel system 18 may be any suitable controllably actuated fuel system. In the embodiment shown, fuel system 18 is in the form of a fuel injection system under the control of ECM 14. Other suitable controllably actuated fuel systems may be used, depending upon the specific application.

Sensor 22 is positioned in association with flywheel 20 and detects an operating speed of IC engine 12. Sensor 22 may be an optical, proximity, inductive or other suitable sensor for detecting the rotational speed of flywheel 20. Sensor 22 provides an output signal to ECM 14 corresponding to the sensed rotational speed.

External load indicator 16 provides a signal to ECM 14 indicating whether a drop in engine speed is a result of the application of an external load, or some other factor not related to the application of an external high inertial load. For example, external load indicator 16 can be a sensor associated with an operator controlled throttle. If ECM 14 receives a signal from sensor 22 indicating that the engine speed has dropped, and concurrently ECM receives a signal from the throttle sensor indicating that the user just throttled down, then ECM determines that the engine speed drop is not a result of an external load.

As another example, external load indicator 16 can be a sensor associated with a fuel line and providing a fault signal indicating that a fuel line is plugged. The drop in engine speed is thus likely a result of inadequate fuel flow, and ECM 14 determines that the engine speed drop is not the result of an external load.

As yet another example, external load indicator 16 can be a sensor associated with an air filter and providing a fault signal indicating that an air filter is plugged. The drop in engine speed is thus likely a result of inadequate air flow, and ECM 14 determines that the engine speed drop is not the result of an external load.

From the foregoing examples, it is apparent that ECM 14 provides a logical boolean combining of signals from speed sensor 22 and external load indicator 16 to determine if an engine speed drop is a result of an external load or some other factor not related to an external load.

Figure 3:
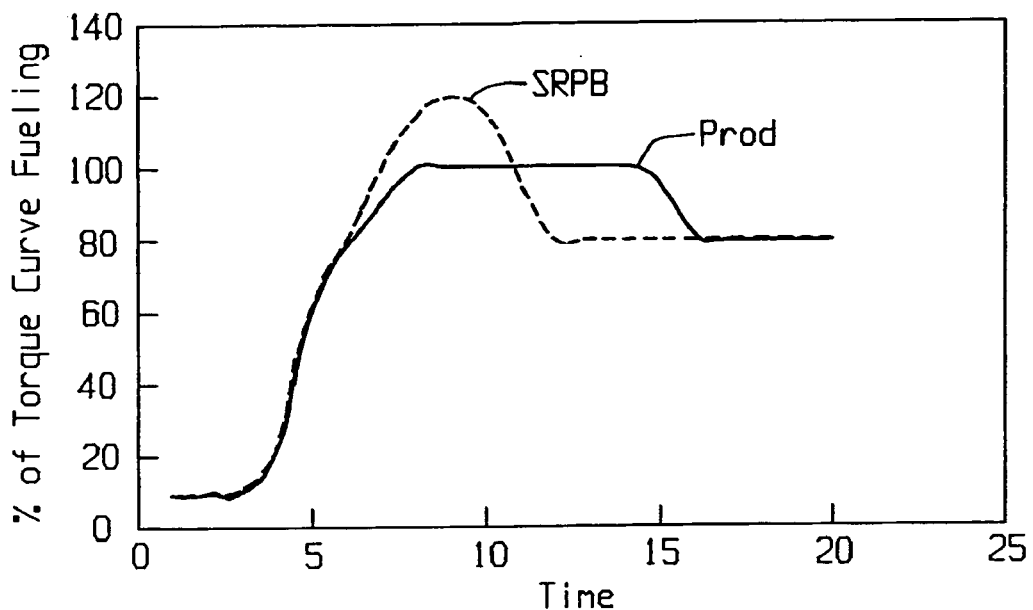
FIG. 3 is a comparative graphical illustration of fueling levels for the method of operating an IC engine of the present invention versus standard torque curve fueling levels.

FIG. 3 illustrates a graphical comparison of fueling levels for the method of operating an IC engine of the present invention versus standard torque curve fueling levels. Under normal operating and load conditions, the maximum fuel level corresponds to the maximum torque output of IC engine 12. The torque curve fueling level in FIG. 3 is represented in %, and therefore the normal maximum fuel level is 100%. On the other hand, when an engine speed reduction is caused by an external load, the engine speed drop causes the engine not to provide a maximum output torque. Therefore, the fuel level can be temporarily increased above the normal maximum fuel level until the engine speed recovers to at or near an operating speed set point.

Figure 4:
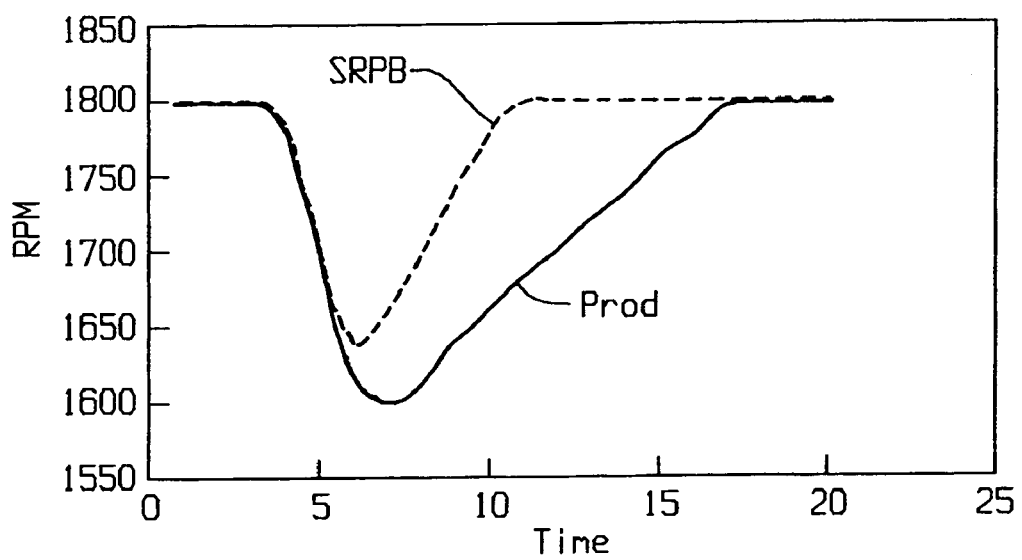
FIG. 4 is a comparative graphical illustration of IC engine operating speed recovery for the method of operating an IC engine of the present invention versus standard torque curve operation.

FIG. 4 illustrates a graphical comparison of IC engine operating speed recovery for the method of operating an IC engine of the present invention versus standard torque curve operation. In the example shown, without use of the present invention, the recovery time for returning to an engine operating speed set point of 1800 RPM is approximately 17 seconds. On the other hand, with the use of the present invention, the recovery time for returning to an engine operating speed set point of 1800 RPM is approximately 10 seconds. This results in better operability and fuel savings of IC engine 12.

Figure 2:
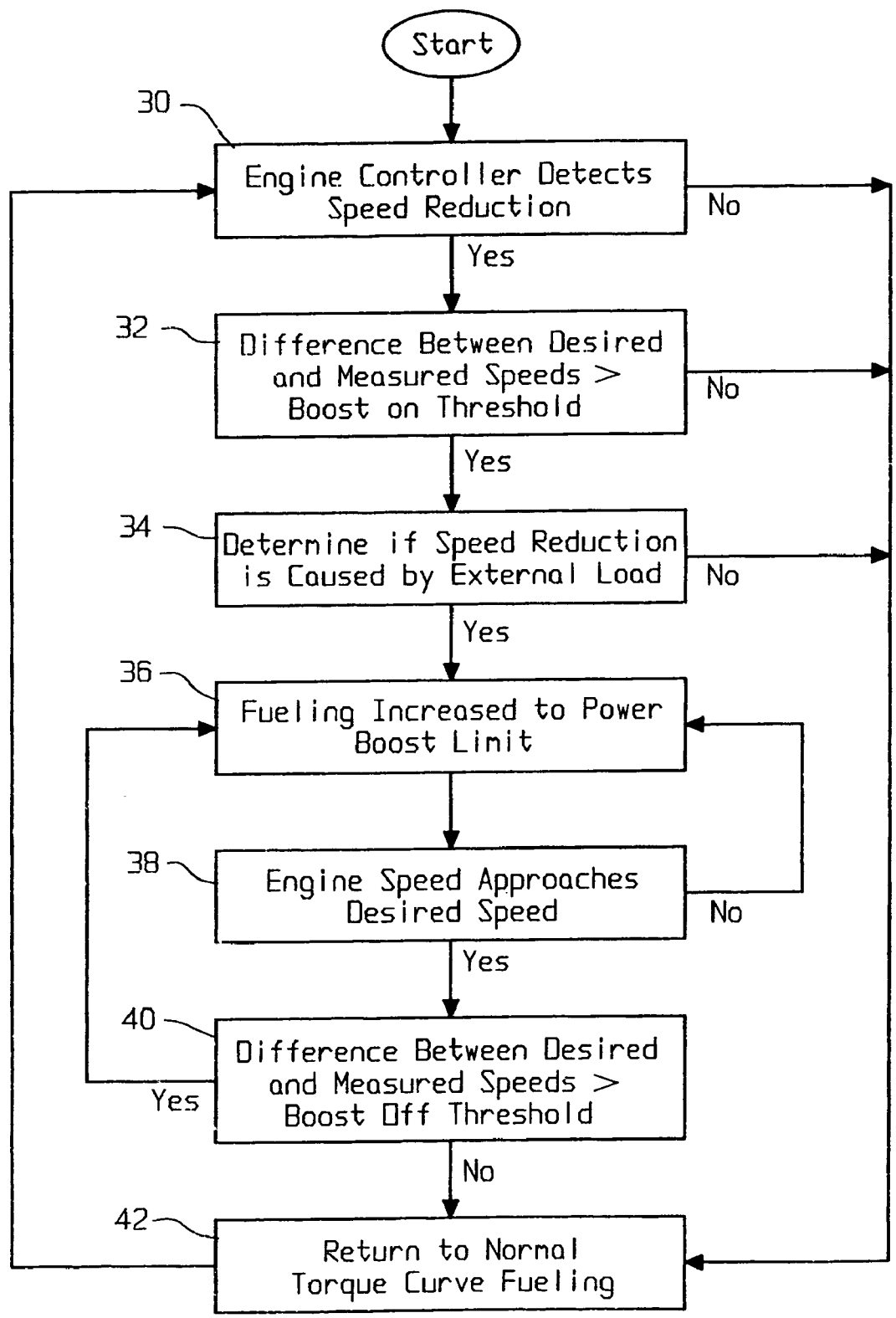
FIG. 2 is a flow chart of an embodiment of the method of operating an IC engine of the present invention.

Referring now again to FIGS. 1 and 2 conjunctively, the operation of IC engine system 10 will be described in greater detail. ECM 14 normally controls fuel injection system 18 to provide a fuel level corresponding to a standard torque curve fueling level. The normal maximum fuel injected by fuel injection system 18 thus corresponds to the maximum torque level on the standard torque fueling curve. Sensor 22 senses an operating speed of flywheel 20 and provides output signals to ECM 14 representing the sensed operating speed. ECM 14 compares the measured speed value with a desired speed value and determines if a speed reduction has occurred (FIG. 2, block 30). In one embodiment, ECM 14 subtracts the measured speed value from the desired value to obtain a difference. The difference between the desired speed and the measured speed is then compared with a "boost on" threshold value. If the difference is greater than the value of the "boost on" threshold value, then an undesired drop in speed has occurred (block 32). This approach allows an incremental drop in engine speed to be used to determine if an undesirable engine speed reduction has occurred, regardless of the engine speed set point.

As another option, it may be possible to use an actual value of the desired speed and measured speed to determine if an undesirable engine speed reduction has occurred. For example, a throttle sensor can provide an output signal representing an operator selected desired engine speed. The difference between the actual values of the desired engine speed and sensed engine speed can be compared with a "boost on" threshold value representing an actual operating speed to determine if an undesirable engine speed reduction has occurred. For example, if the desired operating speed is at 1800 RPM and the sensed speed drops to 1600 RPM, then an unacceptable engine speed reduction has occurred. This technique would likely require a look-up table or a boost on threshold value taken as a percentage of the desired operating speed.

If ECM 14 detects a speed reduction as a result of the input signals from speed sensor 22, then ECM 14 also checks for an input signal from external load indicator 16 indicating an operator requested a speed reduction or some other type of fault signal (block 34). If ECM 14 determines that the speed reduction is a result of an external load, then ECM 14 controls fuel injection system 18 to provide a maximum fuel injection level which is above the normal maximum fuel level (block 36). It is not desirable to maintain the fuel injection level above the normal maximum fuel injection level when IC engine 12 recovers to a speed at or near an operating set speed (which might cause IC engine to have an output exceeding maximum torque output), so ECM 14 continues to receive signals from speed sensor 22 (block 38). As the sensed speed approaches the desired operating speed, the difference between the sensed speed and the desired operating speed becomes smaller. When this difference is less than a "boost off" threshold value (block 40), then ECM 14 controls fuel system 18 to provide a fuel level which is at or below the normal maximum fuel output level (block 42).

In the embodiment of the invention described above and shown in FIG. 2, the determination as to whether an engine speed reduction is caused by an external load includes determining whether an operator throttled down the speed of the engine or whether some other fault condition occurred which could have caused the engine speed reduction. These determinations for causes of an engine speed reduction other than an external load are represented in box 34 of FIG. 2. In another embodiment, it is also possible to check only for a fault condition in box 34, and accommodate an operator initiated throttling down of the engine in box 32. In other words, when the operator throttles down, the new operator initiated throttle speed becomes the new desired engine speed in box 32, and the difference between the new desired speed and measured speed is compared to the boost on threshold value. Under this control scenario, then only a determination for another engine fault condition is made in box 34.

Having described the preferred embodiment, it will become apparent that various modifications can be made without departing from the scope of the invention as defined in the accompanying claims.

The invention claimed is:

1. A method of operating an internal combustion engine, comprising the steps of:
   sensing an operating speed of said internal combustion engine;
   detecting an operating speed reduction using said sensed operating speed;
   comparing a difference between a desired operating speed and said sensed operating speed with a "boost on" threshold value;
   controlling operation of a fuel supply system to increase an output of fuel above a normal maximum fuel output, dependent upon said comparison, wherein said normal maximum fuel output corresponds to a maximum fuel level on an engine torque curve.

2. The method of operating an internal combustion engine of claim 1, including the steps of:
   comparing a difference between said desired operating speed and said sensed operating speed with a "boost off" threshold value; and
   controlling operation of said fuel supply system to provide an output of fuel at or below said normal maximum fuel output when said subtracted difference is less than said "boost off" threshold value.

3. An internal combustion engine system, comprising:
   a sensor for sensing an operating speed of said internal combustion engine and providing a first output signal;
   an external load indicator providing a second output signal;
   a fuel supply system; and
   an electrical processing circuit coupled with each of said sensor, said external load indicator and said fuel supply system, said electrical processing circuit controlling operation of said fuel supply system to increase an output of fuel above a normal maximum fuel output, dependent upon said first output signal and said second output signal.

4. The internal combustion engine of claim 3, wherein said fuel supply system provides a power boost maximum fuel output when said first output signal corresponds to an operating speed below a threshold level, and said second output signal corresponds to an external load applied to said internal combustion engine.

5. The internal combustion engine of claim 3, wherein said external load indicator includes at least one of:
   an output signal from an operator controlled throttle; and
   a fault code associated with said internal combustion engine.

6. The internal combustion engine of claim 3, wherein said electrical processing circuit is configured for subtracting a value of said sensed operating speed from a desired operating speed; comparing said subtracted difference with a "boost off" threshold value; and controlling operation of said fuel supply system to provide an output of fuel at or below said normal maximum fuel output when said subtracted difference is less than said "boost off" threshold value.

7. A method of operating an internal combustion engine, comprising the steps of:
   detecting an operating speed reduction of said internal combustion engine;
   determining if said operating speed reduction is caused by an external load; and
   controlling operation of a fuel supply system to increase an output of fuel above a normal maximum fuel output, when said operating speed reduction is caused by said external load, wherein said normal maximum fuel output corresponds to a maximum fuel level on an engine torque curve.

8. The method of operating an internal combustion engine of claim 7, wherein said step of determining if said operating speed reduction is caused by an external load includes determining at least one of:
   an operator initiated decrease in operating speed; and
   a fault code associated with said internal combustion engine.

9. The method of operating an internal combustion engine of claim 7, including the steps of:
   sensing an operating speed of said internal combustion engine;
   subtracting a value of said sensed operating speed from a desired operating speed;
   comparing said subtracted difference with a "boost off" threshold value; and
   controlling operation of said fuel supply system to provide an output of fuel at or below said normal maximum fuel output when said subtracted difference is less than said "boost off" threshold value.

10. The method of operating an internal combustion engine of claim 7, wherein said fuel supply system has a normal maximum fuel output corresponding to a normal maximum torque, and a power boost maximum fuel output which is above said normal maximum fuel output.

11. The method of operating an internal combustion engine of claim 7, including the steps of:
   sensing an operating speed of said internal combustion engine, and
   comparing a value associated with said sensed operating speed with a threshold value, said determining step being carried out dependent upon said comparison.

12. The method of operating an internal combustion engine of claim 11, including the step of subtracting a value of said sensed operating speed from a desired operating speed, said comparing step comprises comparing said subtracted difference with said threshold value, and said determining step is carried out when said subtracted difference is greater than said threshold value.

13. The method of operating an internal combustion engine of claim 7, including the steps of: sensing an operating speed of said internal combustion engine using a sensor, and outputting a signal from said sensor to an electrical processing circuit, said electrical processing circuit effecting said controlled operation of said fuel supply system.

14. The method of operating an internal combustion engine of claim 13, wherein said fuel supply system provides a power boost maximum fuel output which is above said normal maximum fuel output.

15. A method of operating an internal combustion engine, comprising the steps of:
   sensing an operating speed of said internal combustion engine;
   detecting an operating speed reduction using said sensed operating speed;
   comparing a difference between a desired operating speed and said sensed operating speed with a "boost on" threshold value;
   determining if said operating speed reduction is caused by an external load; and
   controlling operation of a fuel supply system to increase an output of fuel above a normal maximum fuel output, dependent upon each of said comparing and determining steps, wherein said normal maximum fuel output corresponds to a maximum fuel level on an engine torque curve.

16. The method of operating an internal combustion engine of claim 15, therein said determining step is carried out when said compared difference is greater than said "boost on" threshold value.

17. The method of operating an internal combustion engine of claim 15, wherein said step of determining if said operating speed reduction is caused by an external load includes determining at least one of:
   an operator initiated decrease in operating speed; and
   a fault code associated with said internal combustion engine.

18. The method of operating an internal combustion engine of claim 15, including the steps of:
   comparing a difference between said desired operating speed and said sensed operating speed with a "boost off" threshold value; and
   controlling operation of said fuel supply system to provide an output of fuel at or below said normal maximum fuel output when said subtracted difference is less than said "boost off" threshold value.

19. The method of operating an internal combustion engine of claim 15, wherein said fuel supply system has a normal maximum fuel output corresponding to a normal maximum torque, and a power boost maximum fuel output which is above said normal maximum fuel output.

20. The method of operating an internal combustion engine of claim 15, wherein said operating speed is sensed using a sensor, said sensor outputting a signal to an electrical processing circuit, said electrical processing circuit effecting said controlled operation of said fuel supply system.

21. The method of operating an internal combustion engine of claim 20, wherein said fuel supply system provides a power boost maximum fuel output which is above said normal maximum fuel output.

\* \* \* \* \*